United States Patent [19]

Panaroni

[11] Patent Number: 4,855,096

[45] Date of Patent: Aug. 8, 1989

[54] METHOD FOR MAKING POLYURETHANE TIRES WITH AN OUTER SKIN

[76] Inventor: Vincent F. Panaroni, 2330 Susan, Santa Anna, Calif. 92704

[21] Appl. No.: 866,360

[22] Filed: May 23, 1986

[51] Int. Cl.$^4$ .................. B29C 67/20; B29C 41/04; B29D 9/00
[52] U.S. Cl. .................. 264/45.5; 264/45.7; 264/311; 264/DIG. 5; 264/DIG. 13; 264/DIG. 14; 425/425
[58] Field of Search .................. 264/311, 45.5, 45.7, 264/DIG. 5, DIG. 13, DIG. 14; 425/425

[56] References Cited

U.S. PATENT DOCUMENTS

| | | | |
|---|---|---|---|
| 3,200,180 | 8/1965 | Russ | 264/311 |
| 3,505,437 | 4/1970 | Eichmann | 264/311 |
| 3,605,848 | 9/1971 | Lombardi | 264/DIG. 5 |
| 3,751,551 | 8/1973 | McGillvary | 264/311 |
| 3,956,448 | 5/1976 | Larson | 264/311 |
| 4,472,340 | 9/1984 | Boden | 264/311 |
| 4,478,567 | 10/1984 | Schaer | 425/425 |

OTHER PUBLICATIONS

Handbook of Foamed Plastics; Rene Bender; 1965; Lake Publishing Co. Libertyville Ill., pp. 134–135.
Advances in Polyurethane Technology; J. M. Buist and H. Gudgeon; 1968; Wiley & Sons Inc., N.Y.; p. 274.

*Primary Examiner*—James Lowe
*Assistant Examiner*—Jeremiah F. Durkin, II
*Attorney, Agent, or Firm*—B. Deon Criddle

[57] ABSTRACT

A method for producing articles of polyurethane or the like wherein a mold of the article shape is positioned to centrifugally receive a polyurethane composition comprising polyisocyanates, polyol, water and fluorocarbons such that the polyurethane molecules striking the wall of the mold are broken to provide a resulting smooth non-porous outer skin for the article and wherein additional polyurethane materials provide a foamed interior for the article. The water serves as a reactive polyol and reacts with the polyisocyanate to create carbon dioxide gas which yields increased expansion pressure which causes the foaming polymer to produce a uniform skin around a cellular inner core.

8 Claims, 2 Drawing Sheets

METHOD FOR MAKING POLYURETHANE TIRES WITH AN OUTER SKIN

BACKGROUND OF THE INVENTION

1. Field of the Invention

This invention relates to apparatus and method for processing polyurethane foams to form bicycle tires and the like.

2. Prior Art

For several years now polyurethane foams have been used to produce products having outer integral skins surrounding or partially surrounding a core. It has been recognized, for example, that bicycle tires and wheelchair tires can be produced having an outer integral skin and a solid core. Such products have gained acceptance, because they give a ride that is rather comparable to pneumatic tires while not being subject to loss of air through punctures, blow-outs, etc. The previously known products, however, have been of inconsistent quality, frequently having areas in the finished part which will vary in density. Such density variances, result in inconsistent wear of the tires and will not provide consistent comfortable riding qualities.

OBJECTS OF THE INVENTION

Principal objects of the present invention are to provide an apparatus and method useable in the production of non-pneumatic tires, and other products that will have a tough outer integral skin surrounding a foamed inner core of uniform density.

Other objects are to provide a non-pneumatic tire that will provide the ride and comfort of a pneumatic tire, while having greater wear-life and not subject to puncture or blow-out.

In the past, solid polyurethane tires, semi-pneumatic polyurethane tires, solid rubber tires, and solid tires made of other materials, have been proposed. Polyurethane foams have also been used, but the variation of density throughout the finished product, together with voids and blemishes in the product surface have greatly limited the acceptance of the products produced.

It is therefore, another object of the present invention to provide apparatus and method for producing articles from polyurethane foams that have uniform density throughout the cores thereof and integral surfaces free of voids, blemishes and other defects.

Another object of the invention is to produce a non-pneumatic tire at a cost that will allow such tire to compare favorably in the marketplace with pneumatic tires.

Yet another object is to provide a non-pneumatic tire, that is not subject to loss of air as a result of punctures and blowouts, but that will still provide the ride characteristics of a pneumatic tire.

FEATURES OF THE INVENTION

Principal features of the apparatus of the invention include a mold holder, including means to position an article forming mold thereon in surrounding relationship to a distribution plate and a clamping plate adapted to engage the mold whereby the mold is sandwiched between the mold holder and the clamping plate. The mold holder and clamping plate are mounted to spin about a common central axis, to thereby spin the mold secured between them. A drive motor is provided to drive a shaft of the mold holder to obtain the desired spinning action.

A resin supply head receives the components of the resinous material used to make the polyurethane foam and supplies the materials through a feed tube through the clamping plate and onto the distribution plate.

The mold is made to encircle the distribution plate and has an inner circumferential opening at the level of the top surface of the distribution plate, whereby, materials supplied to the distribution plate through the inlet tube will, upon spinning of the mold holder, clamping plate, and mold therebetween, be distributed evenly into the mold.

The method of the present invention involves using polyurethane foam mixes formulated such that cells of the foam projected against the surface of a host mold collapse as the bulk of the foam is forced into the mold and against the cells at the wall. The collapsing cells form a tough outer skin for the product being molded and the collapse of the cells is more rapidly developed and improved by the rotation of the mold about a central axis. The rotation of the mold also results in a foamed core, surrounded by the tough outer skin, with the core being of uniform density, throughout the article produced. The speed of rotation of the mold is predetermined to achieve desired skin thickness and consistency. It is also possible to use varying speeds of rotation speeds correlated to the various stage of polymer growth to enhance the forming mass in the production of molded items with uniform skins, surrounding uniform inner cores of foam.

The foam mixture used comprises conventional polyisocyanates and polyols and water. Halogenated aliphatic hydrocarbon blowing agents may also be used along with the water. Also, silicone surfactants may be used to maintain a fine uniform stable bubble for cell development. Alternatively, Freon (flourinated hydrocarbons) may be added to the mix to provide for proper foaming and uniform density of the core of the product.

While the apparatus and process are here disclosed as being suitable for the production of bicycle tires, it will be apparent that other items can be produced by chaning the shape of the mold used.

Additional objects and features of the invention will become apparent from the following detailed description and drawings, disclosing what is presently contemplated as being the best mode of the invention.

THE DRAWINGS

In the drawing:

FIG. 1 is a side elevation view of the apparatus of the invention with the mold shown in section;

FIG. 2, a top plan view of the apparatus;

FIG. 3, a front elevation view;

FIG. 4, a perspective view of the mold of the invention, with mold halves separated and a tire cord positioned in the mold; and FIG. 5, a perspective view of a bicycle tire produced using the apparatus and method of the invention, partially cut-away to show a cross-sectional view of the tire.

DETAILED DESCRIPTION OF THE INVENTION

Figure 1:
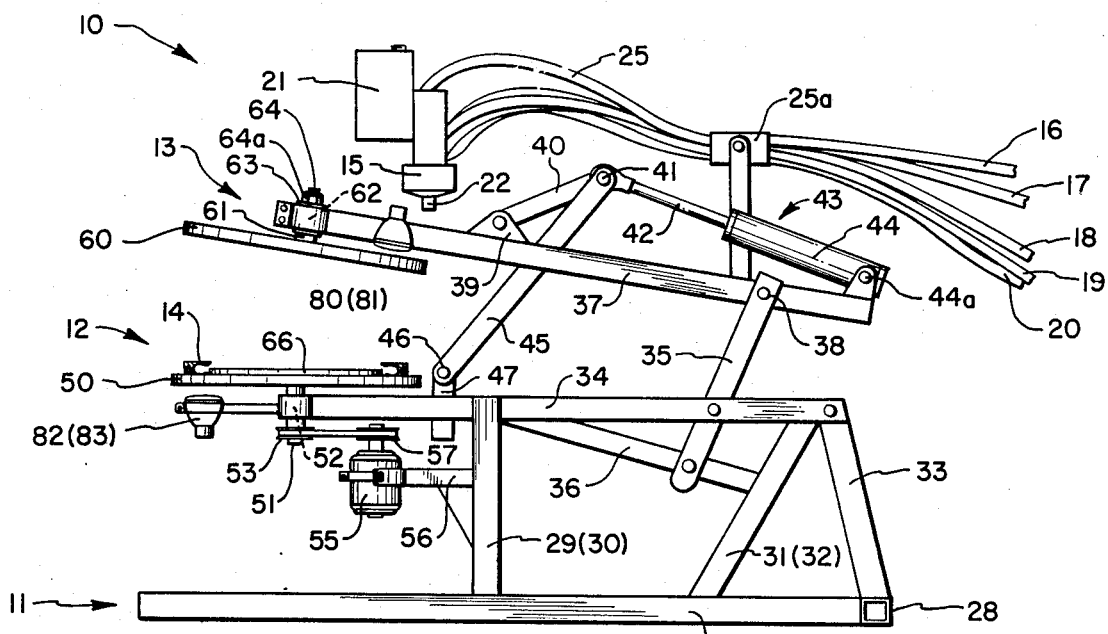
Figure 2:
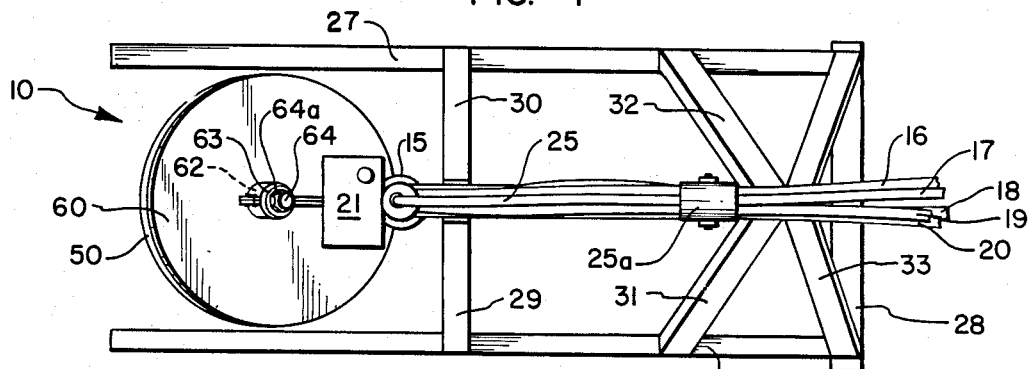
Figure 3:
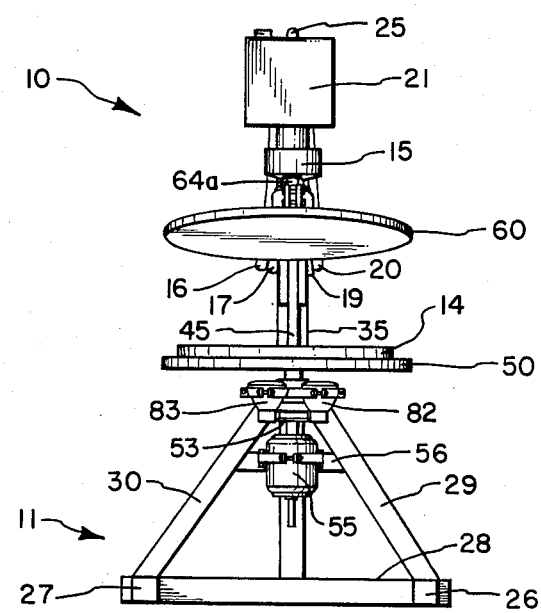
Figure 4:
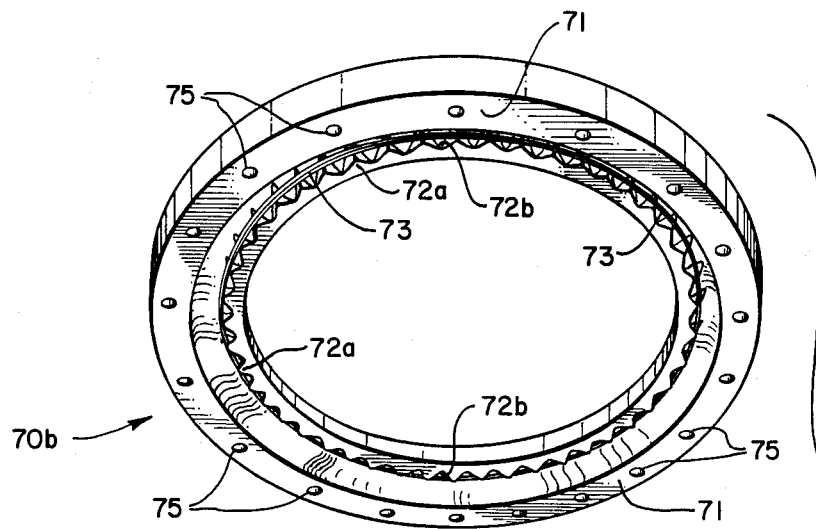
Figure 4:
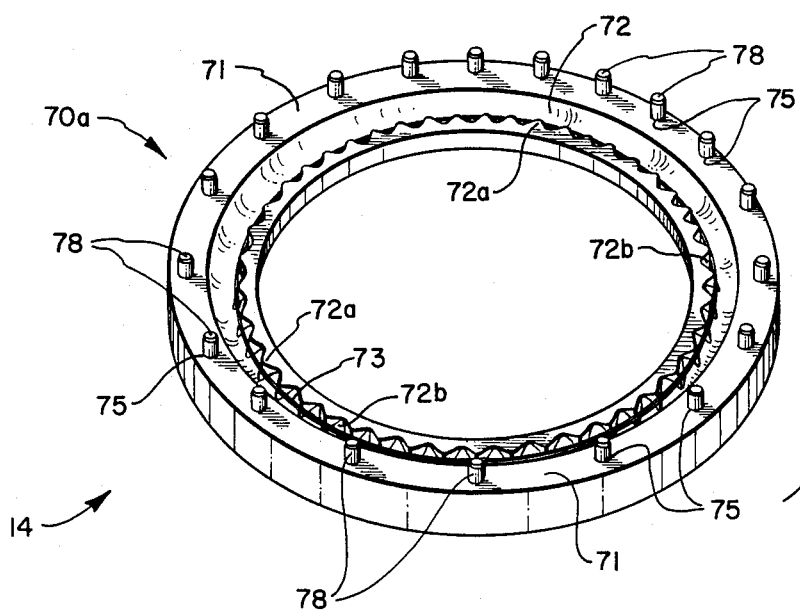

Referring now to the drawing:

In the illustrated preferred embodiment of the invention, the apparatus of the invention comprises a mold holder 10, having a support base 11, a distribution plate assembly 12 and a clamping plate assembly 13. A mold 14 is adapted to be positioned on the distribution plate assembly, as will be further described and a resin supply head 15 is movably mounted to be positioned to supply resinous materials to the mold, also as will be further described.

Resin components and water, as well as such other additives as may be used, i.e., a blowing agent, silicone surfactants and freon are pumped from suitable reservoirs through respective supply lines 16–20 to a proportioning control valve 21 of standard construction. The resin components and other additives are mixed in the valve 21 and are supplied through a nozzle 22 to the mold. The nozzle 22, like the valve 21, lines 16–20 and pumps and reservoirs (not shown) are conventional and well known in the art.

Valve 21 is mounted on an arm 25 that swings up and down and back and forth on an articulated coupling 25a to enable the valve to be easily positioned by an operator.

The base 11 includes ground engaging legs 26 and 27 interconnected by a rear brace 28 and upright struts 29, 30, 31, 32, and 33 that interconnect the legs 26 and 27 and rear brace 28 with a fixed support arm 34 that carries the support base 11 on a cantilevered end thereof.

Uprights 35 fixed at opposite sides of the fixed support arm 34 and a diagonal brace 36 rigidly extending from upright strut 33 to the fixed support arm, pivotally support one end of a pivoted support arm 37. The pivoted support arm 37, in addition to being pivotally connected at 38 to the uprights 35 has a flange 39 to which ends of short links 40 are pivotally connected. The other ends of the short links 40 are connected to a pivot axis 41 that has the end of a rod 42 of a hydraulic cylinder 43 pivotally connected thereto. The cylinder housing 44 of cylinder 43 is pivotally connected at 44a to the end of the pivoted support arm 37 adjacent to pivot 38.

Long links 45 each have one end pivotally connected at 46 to a clamp 47 on the fixed support arm and another end pivotally connected to the pivot axis 40.

The distribution plate assembly 12 comprises a circular disk 50 having a downwardly projecting central axle shaft 51 that extends through bearings 52 in the cantilevered end of fixed support arm 34 and that has a pulley 53 fixed to the shaft.

A motor 55, is carried by a bracket 56 that is fixed to the upright strut 29. A belt 56 interconnects pulley 53 and a pulley 57 on the output shaft of the motor so that operation of the motor will rotate the disk 50.

The clamping plate assembly 13 includes a circular disk 60 sized to conform to disk 50, and having a central projecting feed tube 61 journaled through bearings 62 in the end of pivoted arm 37. A washer 63 surrounding a threaded end 64 of tube 61 and a nut 64a threaded onto the shaft hold the disk 60 to the arm 37. The disk 60 is thus mounted to rotate with the disk 50, as will be further explained.

A circular distribution plate 66 is fixed to the center of plate 50 and the mold 14 is adapted to fit snugly around the plate 66.

The mold 14 is made of a suitable material such as polyurethane, epoxy, silicone, polyester reinforced resins, or of a metal such as aluminum steel or the like, and of two parts 70a and 70b. Each part 70a and 70b comprises a circular partial back member 71, a wall 72 and a circular inner flange 72a with spaced notches 72b therearound that extend into a trough. A string or cord 73 of nylon, or other suitable material fits in the trough and closely around the inner flange of each part 70a and 70b. Holes 75 are spaced around an inside wall of the partial back members 71 and pins 78 are inserted snugly into the holes. When the parts 70a and 70b are assembled and held together with pins 78 the partial back members 71 form a continuous back member and the walls 72 form side walls of the mold. The inner flanges project towards one another, but are spaced apart. A desired tire tread is formed on the interior surfaces of the partial back members.

When the mold 14 is positioned on the circular disk 50 it closely surrounds the distribution plate 66 with one wall 72 against the distribution plate 66 and the leg of the other wall 72 and the inner flange thereon spaced slightly above the level of the upper surface of the distribution plate 66.

In operation, the mold 14 is assembled and is placed on disk 50 in surrounding relationship to the distribution plate 66. The cylinder 44 is operated to pivot the clamping plate assembly forward and down about the pivots 38, 46, 41 and 39 until the disk 60 is flush against the mold 14. The pressure applied by the disk 60 to the mold is determined by the pressure setting of cylinder 44.

The arm 25 and nozzle 22 are then moved to position the nozzle to discharge into and through the tubular feed tube 61 and onto distribution plate 66.

The motor 55 is actuated to rotate the disk 50, mold 14 and disk 60 and valve 21 is actuated to supply resin component, water and other additives through the nozzle 22.

The resin mix supplied through nozzle 22 is directed onto the turning distribution plate 66 and as a result of centrifugal action forms a sheet of material on the plate that is evenly distributed outwardly to the edge of the plate and into the mold. The rotation of the mold then causes the initially entering resin mix to impinge on the walls and back member, and in accordance with the process of the invention, the cells of the impinging polyurethane resin collapse against the mold wall and the cells of the subsequently entering resin provide a foamed inner core.

A pair of lamp holders 80 and 81 are mounted at opposite sides of pivoted support arm 37 and lamps threaded into the usual sockets in the lamp holder are directed against the disk 60 so that the lamps will provide heat necessary for curing the resins used in practicing the method of the invention. Similarly, lamp holders 82 and 83 mounted at opposite sides of the fixed support arm 34 provide means for directing lamps threaded thereunto against the disk 50 to further provide heat necessary for curing the resin inside the mold 14. The lamps in the holders 80, 81, 82 and 83 can be separately actuated or can be actuated with motor 55.

After a product has been formed and cured in the mold 14, the mold is removed from the mold holder, the parts 70a and 70b are separated and the cured part, formed in the space 76 formed by the opposing troughs, is pulled from the mold. The part formed in the herein described mold is a solid tire for use on bicycles, wheelchairs and the like.

The motor 55 may be a variable speed motor that can be used to selectively change the speed of rotations of the disks 50 and 60 and a mold positioned between them.

The method of the invention is best performed using the apparatus heretofore described.

In practicing the method, the usual polyurethane foam material, consisting of conventional polyisocyanates and polyol in an amount sufficient to fill the mold are supplied to the mold, as through the valve 21 and nozzle 22 and water is added to the mix. While it has long been recognized that addition of water to a polyurethane foam will cause excessive foaming and a weak and unstable mass, it is important to the present invention that extraneous water be added to the mixture. The extraneous water serves as a reactive polyol and reacts with the polyisocyanate to create carbon dioxide gas which yields greater expansion pressure than is normally experienced during processing of urethane. It has been found that the greater expanding forces, when coupled with the controlled speed of centrifugal spinning during the critical foaming stages of the generated foaming polymer mass allows the foam to produce uniform skins around a cellular inner core of the part being produced. With the use of the extraneous water concurrently with the spinning of the mold a remarkable strength increase in the product is achieved. The resulting product has an outer skin with zero pores and with the porosity of the material increasing from the outer skin into the interior thereof.

In practice it has been found that some suitable tires can be processed using uniform rotational speeds of between one hundred fifty and three hundred (150-300) RPM.

It has also been found that a more dense product suitable for more uses can be produced utilizing varying rotational speeds. This is accomplished, for example, if a high speed of rotation such as four to five hundred (400-500) RPM is applied during the initial introduction of the urethane system into the mold, i.e., for a period of one to three seconds; the speed is then reduced for three to nine seconds; and is then increased again for three to nine seconds before being slowed until the cure of the formed product is complete.

The temperatures at which the foam material is cured also affects the density and porosity of the product. It has been found that by maintaining the molds used at a temperature of between Ninety Degrees and One Hundred Ten Degrees (90°-110° F.) Farenheit and preferably at One Hundred Degrees (100° F.) Farenheit the cure time will allow for proper impingement of the material on the molds to form the hard, impervious outer skin and the foamed inner core. It has also been found that the controlled addition of a foaming agent, such as Freon 11 (trichloro-flouro methane) will permit changes in the size of the voids present in the foamed core.

Figure 5:
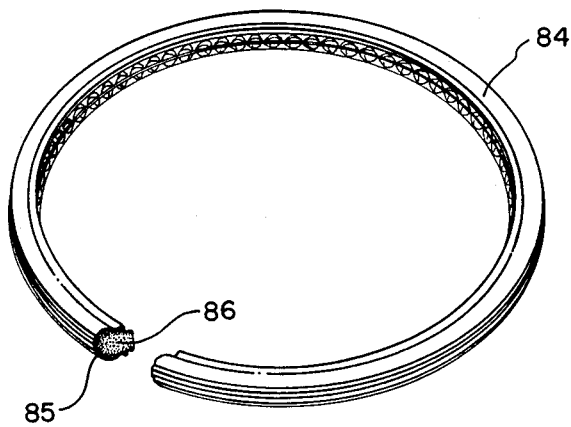

In a typical process, as used to make tires for wheelchairs, for example, twenty-five one hundredths percent (0.25%) by weight of water is added to the urethane foam constituents and two to six percent (2-6%) by weight Freon 11 is added. The constituents are mixed at a nozzle as they are rapidly injected into a mold. The mold is then rotated at two hundred fifty (250) RPM for about twenty-eight (28) seconds until the product is cured, whereupon it is removed from the mold. The resultant tire product 84 (FIG. 5) has a uniform, non-porous outer surface 85 that is essentially free of voids and blisters and an inner core 86 of foamed material. As previously noted strings or cords, preferably of nylon and polyester, provide increased radial strength for the tire.

While disclosed herein as being particularly suitable for production of tires the apparatus and process are suitable for production of other items, as well. For example, bowling balls, innersoles for shoes and many other products can be produced.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A method of producing non-pneumatic tires and the like comprising supplying polyurethane materials comprising polyisocyanates, polyol and added water and fluorocarbons through a mixing valve and nozzle to the center of an upper surface of a circular distribution plate;

rotating the distribution plate in a horizontal plane about a central axis at a rotation speed sufficient to move the polyurethane materials as a sheet centrifugally to the edge of the distribution plate and into a mold carried by the plate and having an opening in alignment with the upper surface and into inpingement with the interior wall of the mold; and continuing the rotation of the distribution plate while filling the mold and during the cure time of the polyurethane materials, whereby the extraneous water serves as a reactive polyol and reacts with the polyisocyanate to create carbon dioxide gas which yields increased expansion pressure which when coupled with the controlled speed of centrifugal spinning during the critical foaming stages of the generated forming polymer mass allows the foam to produce uniform skins around a cellular inner core of a part being produced 2. A method as in claim 1, wherein
   the water is about twenty five one hundreths of the weight of the polyurethane materials.

3. A method as in claim 2, wherein
   the
   fluorocarbons comprise about two to six percent by weight of the polyurethane materials.

4. A method as in claim 1, further including
   providing cords around the interior of the mold to be at least partially surrounded by the polyurethane materials.

5. A method as in claim 1, wherein
   the distribution plate is rotated at one hundred fifty to three hundred revolutions per minute.

6. A method as in claim 5, wherein
   the temperature of the mold and the polyurethane materials is maintained at between ninety and one hundred ten degrees Farenheit during rotation of the distribution plate.

7. A method as in claim 1, wherein
   a rapid rotation speed is established during initial movement of the polyurethane materials into the mold to impact said materials against said mold and to collapse the cells of the material whereby a non-porous surface is formed against the mold surface;

8. A method as in claim 7, wherein
   the initial and final rotation speeds are between four and five hundred revolutions per minute.

* * * * *